(12) United States Patent
Hatano et al.

(10) Patent No.: US 10,821,526 B2
(45) Date of Patent: Nov. 3, 2020

(54) ROTARY TOOL AND METHOD FOR MANUFACTURING MACHINED PRODUCT

(71) Applicant: KYOCERA Corporation, Kyoto (JP)

(72) Inventors: Hirokazu Hatano, Moriyama (JP); Mutsumasa Namba, Higashi-Omi (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/350,000

(22) PCT Filed: Nov. 13, 2017

(86) PCT No.: PCT/JP2017/040793
§ 371 (c)(1),
(2) Date: May 15, 2019

(87) PCT Pub. No.: WO2018/092729
PCT Pub. Date: May 24, 2018

(65) Prior Publication Data
US 2019/0270144 A1     Sep. 5, 2019

(30) Foreign Application Priority Data

Nov. 15, 2016 (JP) .................. 2016-222026

(51) Int. Cl.
  B23B 51/02      (2006.01)
  B23B 51/00      (2006.01)
(52) U.S. Cl.
  CPC .............. *B23B 51/02* (2013.01); *B23B 51/00* (2013.01); *B23B 2251/043* (2013.01);
  (Continued)

(58) Field of Classification Search
  CPC ... B23B 51/00; B23B 51/02; B23B 2251/043; B23B 2251/40; B23C 2210/0492; B23D 2277/52
  See application file for complete search history.

(56) References Cited

U.S. PATENT DOCUMENTS 4,579,180 A * 4/1986 Peetz ................... E21B 10/445
                                                   175/394
4,963,059 A * 10/1990 Hiyama .................. B23C 5/003
                                                   407/60

(Continued)

FOREIGN PATENT DOCUMENTS

DE    202014103192    *  8/2014
DE    102014010922    *  1/2016
(Continued)

*Primary Examiner* — Eric A. Gates
(74) *Attorney, Agent, or Firm* — Viering, Jentschura & Partner MBB

(57) ABSTRACT

A rotary tool may include a body, the body may include a cutting edge and a first groove. The first groove may include a first region having a first helix angle, a second region having a second helix angle, a third region having a third helix angle, a fourth region having a fourth helix angle, and a fifth region having a fifth helix angle. The fourth helix angle and the fifth helix angle may each decrease from a side of a first end toward a second end. A decreasing range of a value of the fourth helix angle of the fourth region may be less than a decreasing range of a value of the fifth helix angle of the fifth region. A length of the fourth region may be greater than a length of the fifth region.

13 Claims, 13 Drawing Sheets

(52) U.S. Cl.
CPC ... *B23B 2251/40* (2013.01); *B23C 2210/0492* (2013.01); *B23D 2277/52* (2013.01); *Y10T 408/9097* (2015.01)

(56) References Cited

U.S. PATENT DOCUMENTS

| | | | | |
|---|---|---|---|---|
| 5,478,176 A * | 12/1995 | Stedt | ................ | B23B 51/02 408/229 |
| 5,800,101 A * | 9/1998 | Jindai | ................ | B23B 51/02 408/230 |
| 6,652,203 B1 * | 11/2003 | Risen, Jr. | ................ | B23B 51/02 408/225 |
| 7,101,125 B2 * | 9/2006 | Borschert | ................ | B23B 51/02 408/230 |
| 8,257,000 B2 * | 9/2012 | Onose | ................ | B23B 51/02 408/230 |
| 8,882,412 B2 * | 11/2014 | Sampath | ................ | B23B 51/02 408/144 |
| 2003/0185640 A1 * | 10/2003 | Ito | ................ | B23B 51/02 408/230 |

FOREIGN PATENT DOCUMENTS

| | | | | |
|---|---|---|---|---|
| JP | 55058907 A | * | 5/1980 | |
| JP | H09-277108 A | | 10/1997 | |
| JP | 3109645 U | * | 5/2005 | |
| JP | 2009018383 A | * | 1/2009 | |
| JP | 2012148384 A | * | 8/2012 | |
| JP | 2013198977 A | * | 10/2013 | |

* cited by examiner

ROTARY TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2017/040793 filed on Nov. 13, 2017, which claims priority to Japanese Application No. 2016-222026 filed on Nov. 15, 2016, which are entirely incorporated herein by reference.

TECHNICAL FIELD

An aspect relates to a rotary tool such as an end mill or a drill used in machining and to a method for manufacturing a machined product.

BACKGROUND

Drills such as a drill described in JP H09-277108 A (Patent Document 1) have been used for machining workpieces such as a metal member. The drill described in Patent Document 1 may include a helical groove through which the generated chips pass. The helical groove may include a leading end portion having a constant helix angle, an intermediate portion in which a helix angle gradually decreases from a leading end to a rear end, and a rear end portion having a constant helix angle that is less than the helix angle of the leading end portion. The length of the leading portion may be from 1 D to 2 D, the length of the intermediate portion may be from 1 D to 3 D, and the length of the rear end portion may be appropriately set depending on the depth of a hole to be machined.

In the drill described in Patent Document 1, in a case that the depth of the hole to be machined is deep, the length occupied by the rear end portion with respect to the entire length of a body may increase. In addition, a region where the helix angle is relatively small may be increased with respect to the entire length of the helical groove. As a result, chips may become stuck on the rear end side where the helix angle is relatively small.

SUMMARY

A rotary tool according to a non-limiting aspect may include a body having a rod-like shape and extending along a rotation axis from a first end toward a second end. The body may include a cutting edge located at the first end, and a first groove extending in a spiral manner from the cutting edge toward the second end. The first flute may include a first region having a first helix angle, a second region located closer to the second end than the first region and having a second helix angle, a third region located closer to the second end than the second region and having a third helix angle, a fourth region located between the first region and the second region and having a fourth helix angle, and a fifth region located between the second region and the third region and having a fifth helix angle.

In a rotary tool according to a non-limiting aspect, the second helix angle may be less than the first helix angle and greater than the third helix angle. The fourth helix angle and the fifth helix angle may each decrease from a side of the first end toward the second end. A decreasing range of a value of the fourth helix angle may be less than a decreasing range of a value of the fifth helix angle. A length of the fourth region in a direction along the rotation axis may be greater than a length of the fifth region in a direction along the rotation axis.

DETAILED DESCRIPTION

Figure 1:
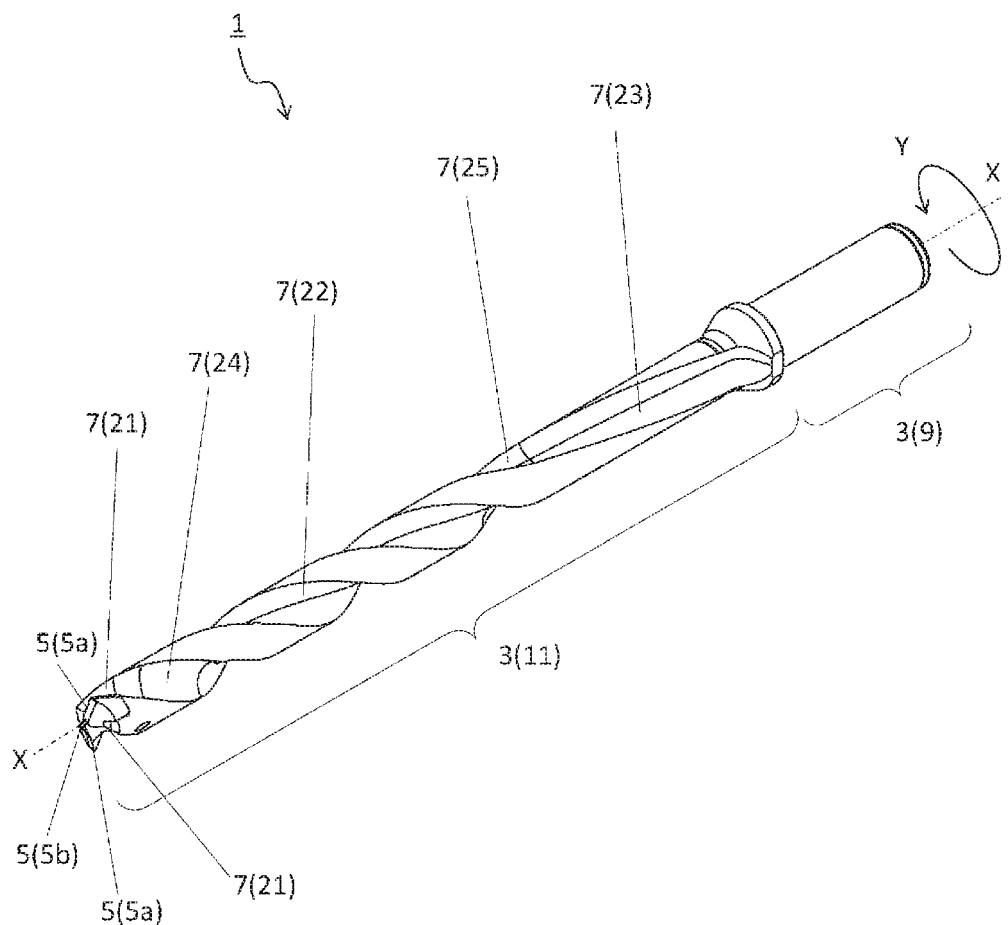
FIG. 1 is a perspective view illustrating a rotary tool (drill) according to an example of a non-limiting embodiment.

The following describes in detail a cutting tool of various non-limiting embodiments using the drawings. However, for convenience of explanation, each of the drawings referenced below is simplified to illustrate only the main members of the constituent members of the various non-limiting embodiments. Accordingly, the cutting tool described below may be provided with any constituent member which is not illustrated in each of the referred drawings. Further, the dimensions of the members in the drawings do not faithfully represent the actual dimensions of the constituent members, the dimension ratios of the members, or the like.

Drill

The cutting tool according to the various non-limiting embodiments below may be a drill. The drill represents a rotary tool. In addition to the drill, examples of the rotary tool may include an end mill and a reamer.

A rotary tool 1 (drill 1) of an example illustrated in FIG. 1 may include a body 3. Furthermore, the body 3 may include a cutting edge 5 and a first groove 7 (hereinafter referred to as a flute 7).

The body 3 of the example illustrated in FIG. 1 and FIG. 3 to FIG. 5 may have a rotation axis X and may have a rod-like shape extending from a first end toward a second end along the rotation axis X. The body 3 may be configured to rotate around the rotation axis X when machining a workpiece for manufacturing a machined product. In the following description, the first end may be referred to as a leading end, and the second end may be referred to as a rear end. Further, a side of the first end that is closer to the first end than the second end may be referred to as a leading end side, and a side of the second end that is closer to the second end than the first end may be referred to as a rear end side.

The body 3 of the example illustrated in FIG. 1 may include a shank 9 and a cutting portion 11. The shank 9 may be a portion that is gripped by a rotating spindle or the like of a machine tool and may be designed according to the shape of the spindle or the like in the machine tool. The cutting portion 11 may be a portion located on a leading end side of the shank 9 and including an area that comes into contact with a workpiece. This portion may play a key role when machining the workpiece. Here, an arrow Y in FIG. 1 and FIG. 2 may indicate a direction in which the body 3 rotates around the rotation axis X.

Figure 6:
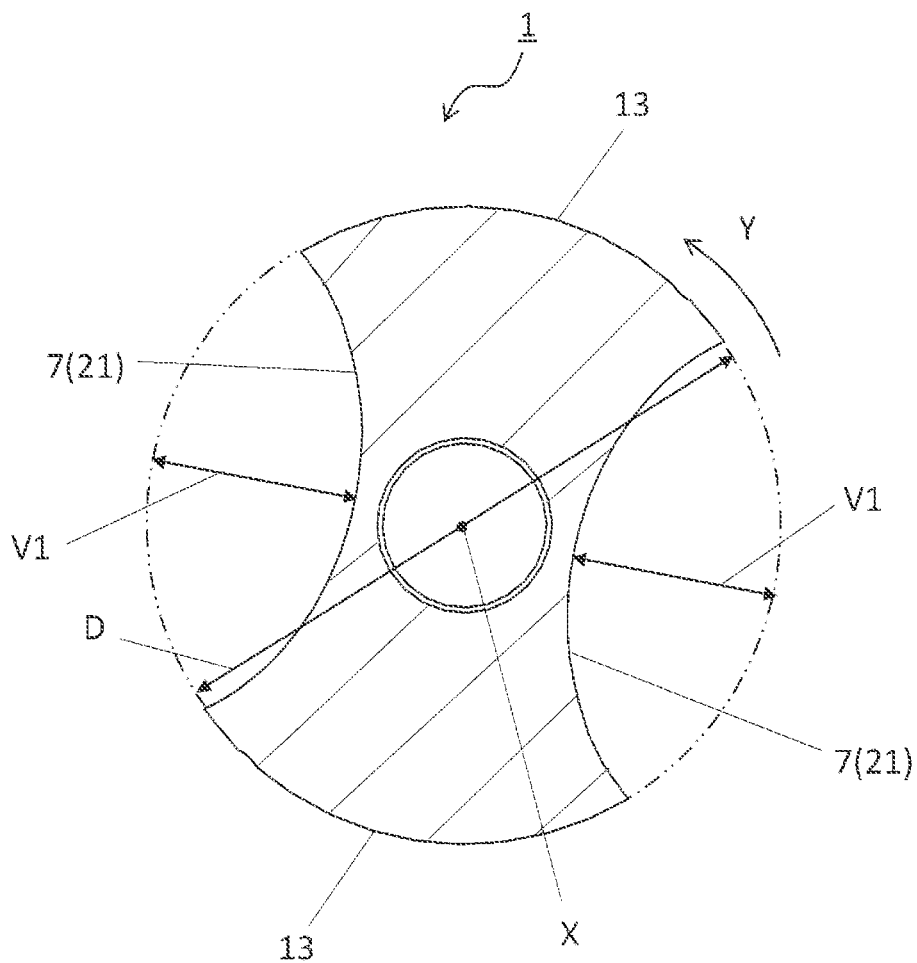
FIG. 6 is a cross-sectional view of the drill illustrated in FIG. 3 at D1.
Figure 7:
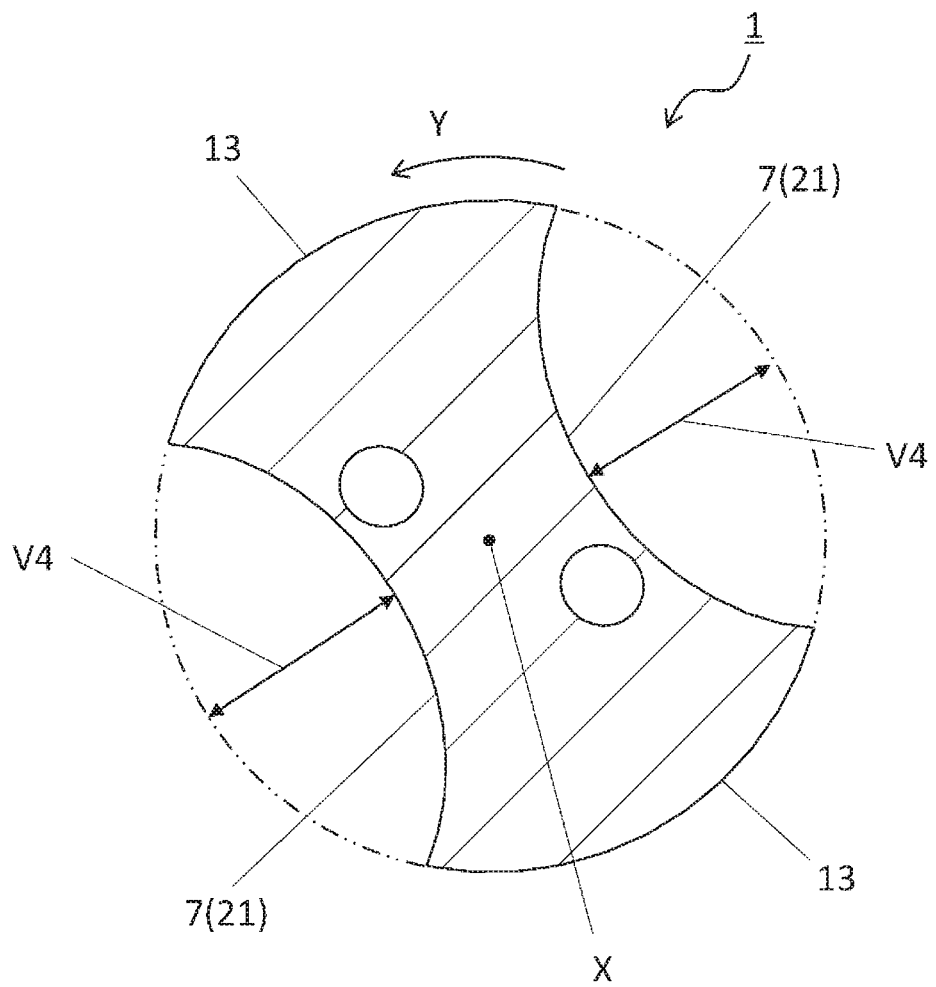
FIG. 7 is a cross-sectional view of the drill illustrated in FIG. 3 at D2.

The cutting portion 11 may have, for example, a cylindrical shape that extends along the rotation axis X and may have a missing portion that defines the flute 7, as illustrated in FIG. 6. As illustrated in the example illustrated in FIG. 6, the cutting portion 11 may include a pair of flutes 7. In a cross section orthogonal to the rotation axis X, portions corresponding to lands 13, of an outer periphery of the cutting portion 11 except for the pair of flutes 7, may form arcs on substantially the same circle. The diameter of substantially the same circle may correspond to the outer diameter of the cutting portion 11.

The drill 1 is not limited to a particular size. The outer diameter of the cutting portion 11 may be set to from 6 mm to 42.5 mm, for example. The drill 1 may also be set to satisfy L=from 8 D to 20 D, for example, where L may be the length of the axis line (length of the cutting portion 11), and D may be the outer diameter of the cutting portion 11.

Examples of the material of the body 3 may include a cemented carbide alloy that contains tungsten carbide (WC) and cobalt (Co) as a binder, an alloy that may include this cemented carbide alloy and an additive such as titanium carbide (TiC) or tantalum carbide (TaC) added thereto, or a metal such as stainless steel and titanium.

Next, a description will be given of the cutting edge 5. The cutting edge 5 may be located at the leading end of the body 3 and may be used as a portion for cutting the workpiece. The cutting edge 5 of an example illustrated in FIG. 2 may include a pair of main cutting edges 5a and a sub cutting edge 5b. The pair of main cutting edges 5a and the sub cutting edge 5b may be located at the leading end of the body 3, i.e., the leading end portion of the cutting portion 11.

Figure 2:
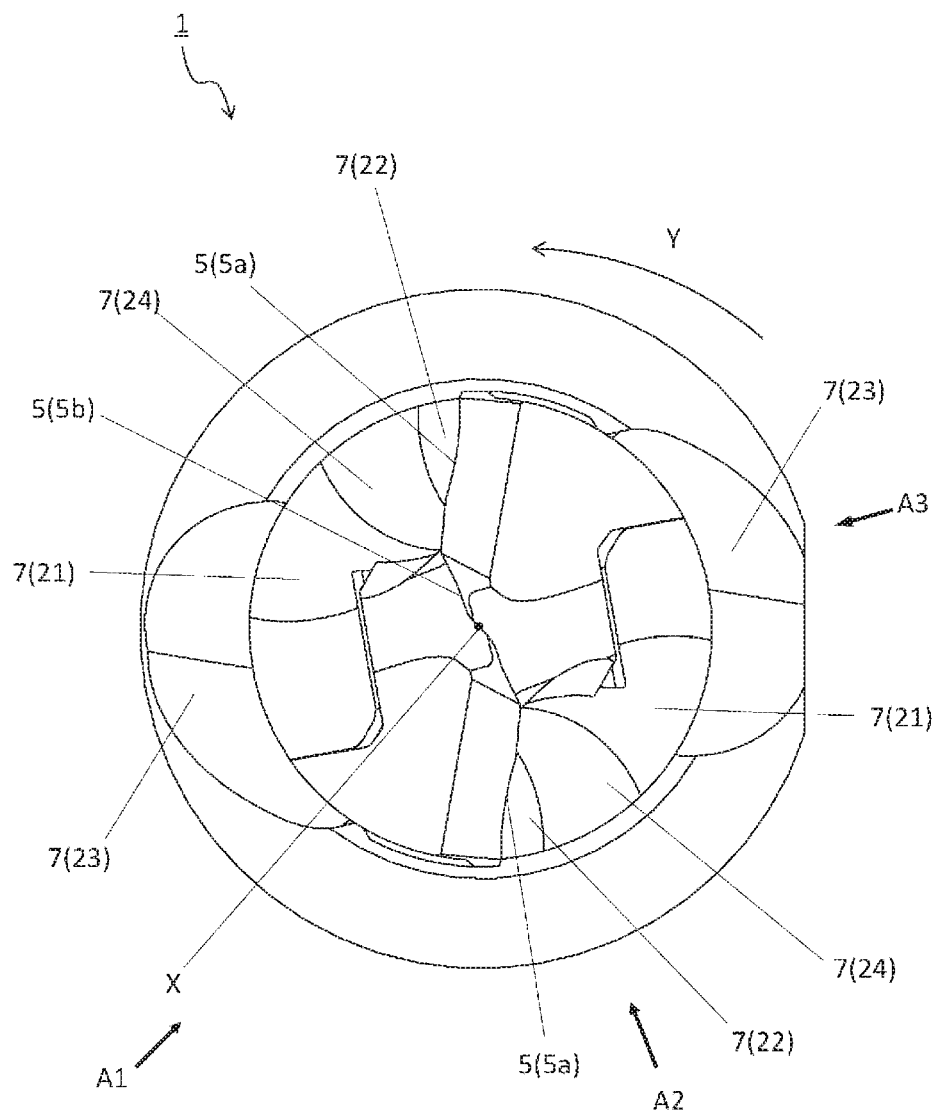
FIG. 2 is a front view illustrating the drill illustrated in FIG. 1 as viewed from a first end.

The sub cutting edge 5b in the example illustrated in FIG. 2 may intersect the rotation axis X in a case where the body 3 is viewed from the leading end thereof. The sub cutting edge 5b can function as a so-called chisel edge. In the example illustrated in FIG. 2, the cutting edge 5 may include the pair of main cutting edges 5a. The cutting edge 5 may include only one main cutting edge 5a or three or more main cutting edges 5a.

The pair of main cutting edges 5a of the example illustrated in FIG. 2 may be connected to both end portions of the sub cutting edge 5b and, when viewed from the leading end, may extend from both ends of the sub cutting edge 5b toward an outer periphery of the body 3. The workpiece may be machined using the pair of main cutting edges 5a and the sub cutting edge 5b. In a case that the sub cutting edge 5b is used as a chisel edge, the chisel angle may be set to approximately from 130 to 170°, for example. As illustrated in FIG. 2, what is meant by "viewed from the leading end" may be a front view of the leading end of the body 3.

The main cutting edge 5a in the example illustrated in FIG. 2 may have a concave curved line shape when viewed from the leading end. As a result, chips generated by the main cutting edge 5a may be easily curled, making it easier to discharge chips through the flute 7. To enhance the cutting performance, the main cutting edge 5a may be provided such that the rotational locus is inclined with respect to the rotation axis X in a case that the body 3 is cut along a virtual plane including the rotation axis X. The inclination angle of the main cutting edge 5a with respect to the rotation axis X may be set to approximately from 50 to 85°, for example. In a case that the main cutting edge 5a has a concave curved line shape, specific shapes of the main cutting edge 5a may include an arc shape, for example.

The pair of main cutting edges 5a in the example illustrated in FIG. 2 may be located away from each other with the sub cutting edge 5b therebetween. The pair of main cutting edges 5a may be 180° rotation-symmetrical around the rotation axis X of the body 3, when viewed from the leading end (front view). In a case where the pair of main cutting edges 5a are rotation-symmetrical as described above, the wobbling generated between the pair of main cutting edges 5a can be reduced when the pair of main cutting edges 5a cut into the workpiece. As a result, stable drilling can be performed.

Next, a description will be given of the flutes 7. The pair of flutes 7 in the example illustrated in FIG. 1 may be located closer to the outer peripheral than the rotation axis X in the cutting portion 11 and may extend from the cutting edge 5 toward the rear end of the body 3. The pair of flutes 7 may extend in a spiral manner around the rotation axis X.

In the example illustrated in FIG. 1, the pair of flutes 7 may each extend in a spiral manner from the pair of main cutting edges 5a toward the rear end of the body 3. Thus, in the example illustrated in FIG. 1, a region of the cutting edge 5 connected to the pair of flutes 7 may correspond to the pair of main cutting edges 5a, and a region of the cutting edge 5 located between the pair of main cutting edges 5a may correspond to the sub cutting edge 5b. At this time, to grip the body 3 in a stable manner in the machine tool, the pair of flutes 7 may be formed only in the cutting portion 11 and thus may not be formed in the shank 9.

The pair of flutes 7 may be mainly intended to discharge chips generated by the pair of main cutting edges 5a and the sub cutting edge 5b to the outside. When machining, chips generated by one of the pair of main cutting edges 5a may be discharged to the rear end side of the body 3 through the flute 7 connected to the main cutting edge 5a, out of the pair of flutes 7. In addition, the chips generated by the remaining one (the other side) of the pair of main cutting edges 5a may be discharged to the rear end side of the body 3 through the flute 7 connected to the other main cutting edge 5a, out of the pair of flutes 7.

At this time, one of the pair of flutes 7 may be formed so as to overlap with the other of the pair of flutes 7 in a case that the other flute 7 is rotated by 180° around the rotation axis X. In this case, chips generated in each of the pair of main cutting edges 5a can be made to flow well through a corresponding flute 7.

Figure 3:
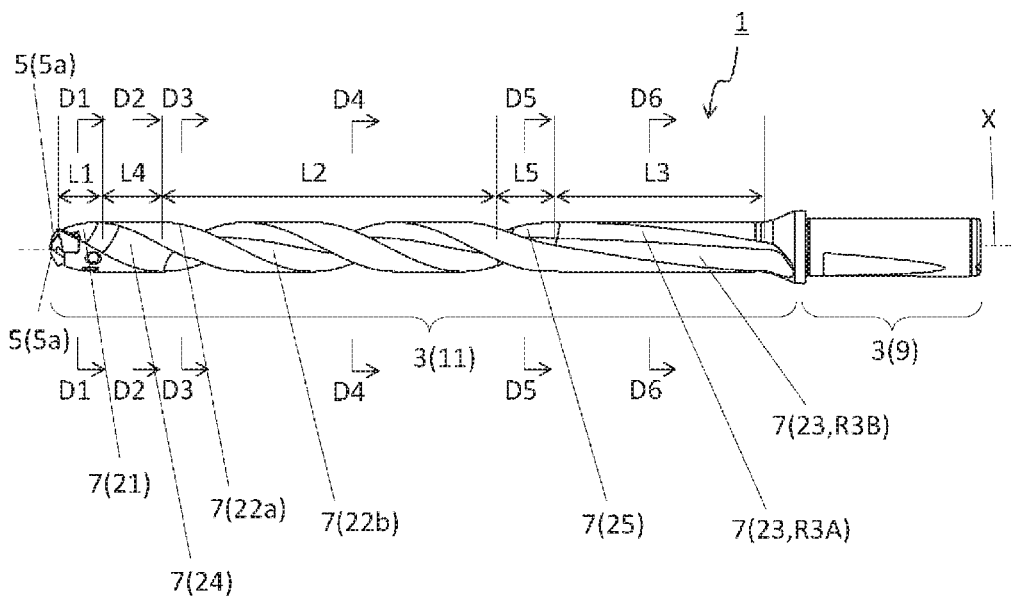
FIG. 3 is a side view from a direction A1 of the drill illustrated in FIG. 2.
Figure 4:
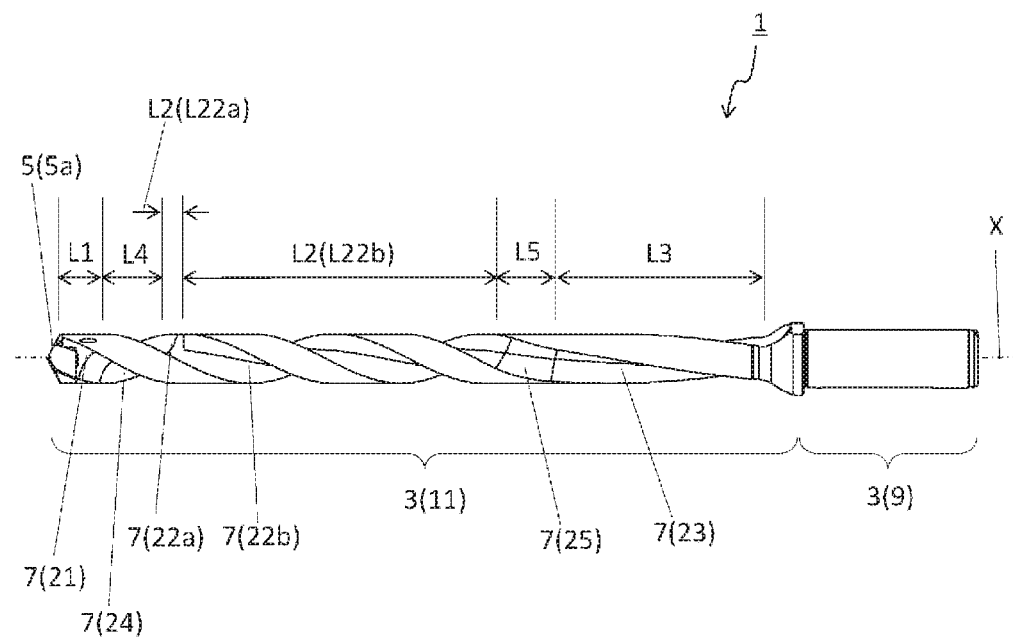
FIG. 4 is a side view from a direction A2 of the drill illustrated in FIG. 2.
Figure 5:
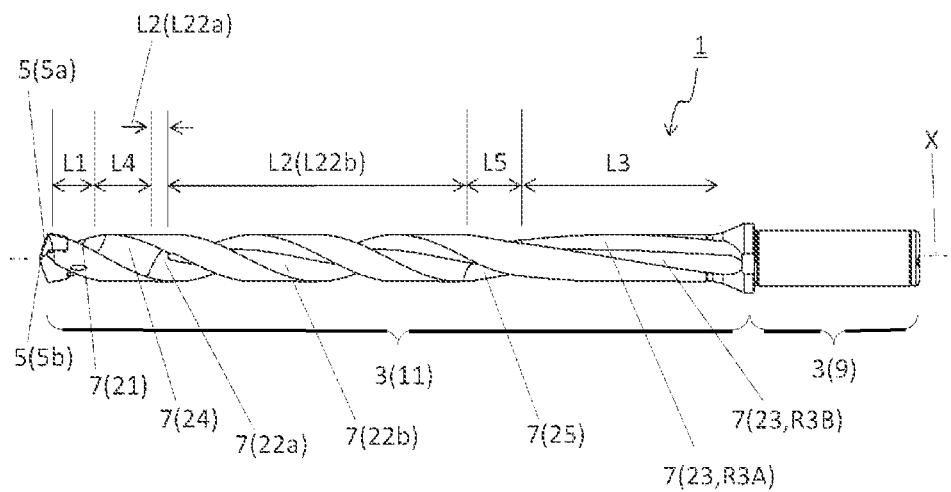
FIG. 5 is a side view from a direction A3 of the drill illustrated in FIG. 2.

The flute 7 in examples illustrated in FIG. 3 to FIG. 5 may include a first region 21, a second region 22, a third region 23, a fourth region 24, and a fifth region 25. These regions may be arranged from the leading end side of the body 3, that is, from the side of the cutting edge 5, in the order of the first region 21, the fourth region 24, the second region 22, the fifth region 25, and the third region 23.

In one example illustrated in FIG. 3 to FIG. 5, the first region 21 may be a region located closer to the leading end of the body 3. In other words, the first region 21 may be a region located closer to the leading end of the flute 7 and may be connected to the main cutting edge 5a. The second region 22 may be a region located closer to the rear end of the body 3 than the first region 21. The third region 23 may be a region located closer to the rear end of the body 3 than the second region 22. The fourth region 24 may be a region located between the first region 21 and the second region 22. The fifth region 25 may be a region located between the second region 22 and the third region 23.

In the example illustrated in FIG. 3 to FIG. 5, the fourth region 24 may be a region connecting the first region 21 and the second region 22. The fifth region 25 may be a region connecting the second region 22 and the third region 23.

Figure 12:
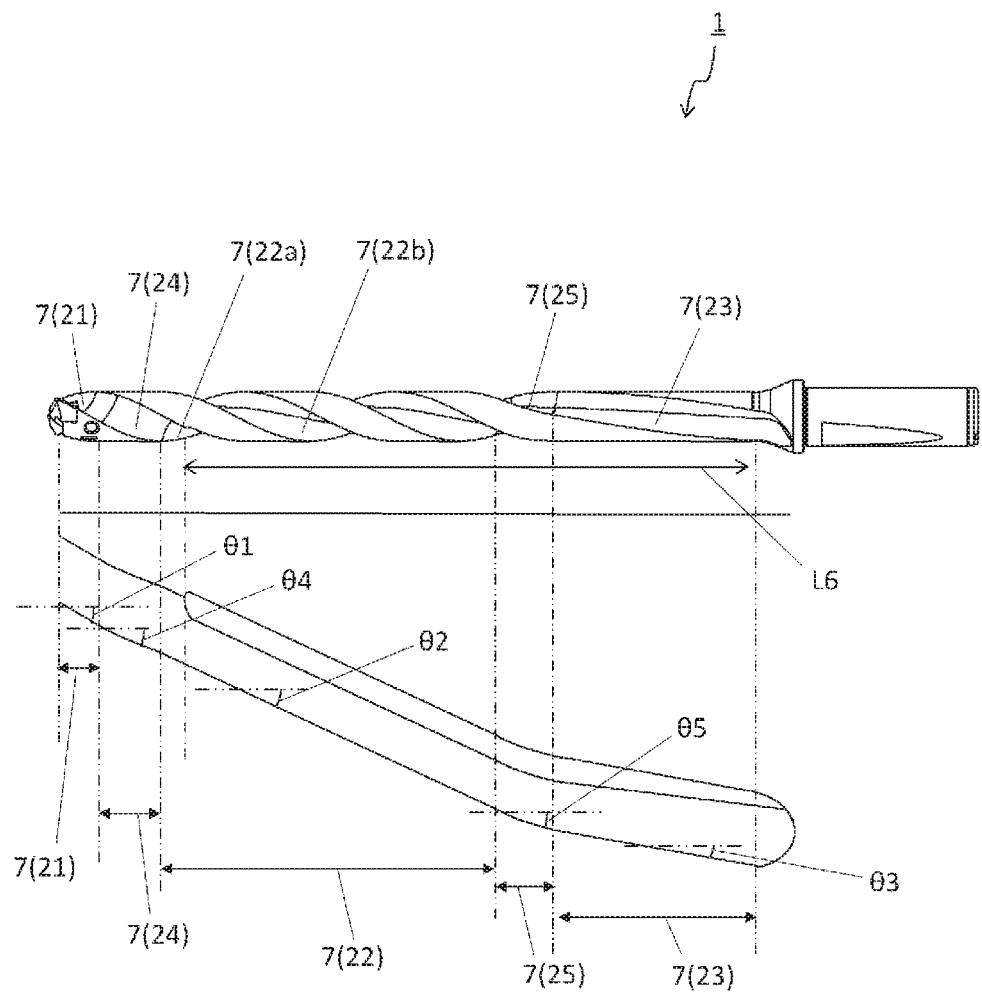
FIG. 12 is a developed view illustrating an overview of a first groove in the drill illustrated in FIG. 1.

In an example illustrated in FIG. 12, the first region 21 may have a first helix angle $\theta 1$, the second region 22 may have a second helix angle $\theta 2$, the third region 23 may have a third helix angle $\theta 3$, the fourth region 24 may have a fourth helix angle $\theta 4$, and the fifth region 25 may have a fifth helix angle $\theta 5$. At this time, in the example illustrated in FIG. 12, the second helix angle $\theta 2$ may be less than the first helix angle $\theta 1$ and greater than the third helix angle $\theta 3$.

The second helix angle $\theta 2$ may have only to be less than the first helix angle $\theta 1$, and the third helix angle $\theta 3$ may have only to be less than the second helix angle $\theta 2$. The first helix angle $\theta 1$ may be approximately from 26 to 30°, for example, the second helix angle $\theta 2$ may be set to approximately from 25 to 29°, for example, and the third helix angle $\theta 3$ may be set to approximately from 10 to 15°, for example.

In the example illustrated in FIG. 12, the fourth helix angle $\theta 4$ and the fifth helix angle $\theta 5$ may each change as they go from the leading end side to the rear end side. Specifically, the fourth helix angle $\theta 4$ and the fifth helix angle $\theta 5$ may each decrease in value from the leading end side toward the rear end side of the body 3. At this time, each of the first regions 21, the second regions 22, and the third regions 23 may have a constant helix angle.

The constant helix angle does not mean that the helix angle is strictly constant from the leading end side toward the rear end side in a target region, but may also have variation of about 5% in helix angle in the target region.

In the example illustrated in FIG. 12, the decreasing range of the value of the fourth helix angle $\theta 4$ of the fourth region 24 may be less than that of the value of the angle of the fifth helix angle $\theta 5$ of the fifth region 25. A length L4 of the fourth region 24 in the direction along the rotation axis X may be greater than a length L5 of the fifth region 25 in the direction along the rotation axis X.

At this time, the decrease amount of the fourth helix angle $\theta 4$ may correspond to the difference between the first helix angle $\theta 1$ and the second helix angle $\theta 2$, and the decrease amount of the fifth helix angle $\theta 5$ may correspond to the difference between the second helix angle $\theta 2$ and the third helix angle $\theta 3$.

The decrease rate of the fourth helix angle $\theta 4$ in the fourth region 24 and the decease rate of the fifth helix angle $\theta 5$ in the fifth region 25 may be constant or gradually vary. In a case that the decrease rate of the fourth helix angle $\theta 4$ in the fourth region 24 and the decrease rate of the fifth helix angle $\theta 5$ in the fifth region 25 are each constant, chip discharge performance may be improved.

In a case that the flute 7 includes the first region 21, the second region 22, the third region 23, the fourth region 24, and the fifth region 25 that have the configuration described above, the flute 7 may have a configuration in which the closer to the leading end of the body 3, the greater is the helix angle. This provides a great force for pushing chips out, thereby improving chip discharge performance. Additionally, the closer to the rear end of the body 3 in the flute 7, the smaller is the helix angle, so the strength of the portion toward the rear end of the flute 7 may be great.

Further, in a case that the fourth region 24, which is longer in the direction along the rotation axis X than the fifth region 25, is located on the rear end side of the first region 21 having a relatively great helix angle, chips may easily pass from the first region 21 to the second region 22, thereby improving chip discharge performance. In particular, in a case that the first region 21 and the second region 22 are connected by the fourth region 24, chip discharge performance may be further improved.

In a case where the fifth region 25, which is shorter in length in the direction along the rotation axis X than the fourth region 24, is located on the leading end side of the third region 23 having a relatively less helix angle, chips can be transferred from the second region 22 to the third region 23 having the least helix angle at the shortest distance. As a result, the rigidity of the portion toward the rear end of the flute 7 can be improved. Since the body 3 has great rigidity, it is possible to not only use the rotary tool 1 in a process for forming a hole with a great depth, but also exhibit high chip discharge performance.

In the present disclosure, the helix angle may refer to an angle formed by the leading edge (leading edge of land) and an imaginary straight line parallel to the rotation axis X, as illustrated in FIG. 12. The leading edge can be indicated by a line of intersection formed by the flute 7 and the land 13 located rearward from the flute 7 in the rotation direction Y of the rotation axis X.

If it is difficult to perform evaluation by the leading edge, the line of intersection formed by the flute 7 and the land 13 (specifically, heel) located frontward from the flute 7 in the rotation direction Y of the rotation axis X may be identified, and the angle formed by the line of intersection and the imaginary straight line that passes parallel to the rotation axis X through one point on the line of intersection may be evaluated as the helix angle.

Furthermore, in the present disclosure, the length of each of the regions (the first region 21 to the fifth region 25) in the direction along the rotation axis X is the length of each of the regions in the direction parallel to the rotation axis X, and as illustrated in FIG. 3 to FIG. 5, refers to the maximum length of each of the regions in the direction parallel to the rotation axis X (the left and right direction in FIG. 3 to FIG. 5).

In the drill 1 of the present disclosure, the length L4 of the fourth region 24 and the length L5 of the fifth region 25 with respect to the entire length of the flute 7 in a direction parallel to the rotation axis X may have only to satisfy the relationship described above. For example, the length L4 can be set to approximately from 0.9 D to 1.5 D, and the length L5 can be set to approximately from 0.7 D to 1.4 D. In addition, the length L1 of the first region 21, the length L2 of the second region 22, and the length L3 of the third region 23 can be set to, for example, approximately from 0.9 D to 1.5 D, approximately from 4 D to 8 D, and approximately from 1 D to 10 D, respectively, with respect to the entire length of the flute 7 in a direction parallel to the rotation axis X.

The flute 7 in the example illustrated in FIG. 3 may include the first region 21 to the fifth region 25. Therefore, the total length of the first region 21 to the fifth region 25 may be the entire length of the flute 7 in the direction parallel to the rotation axis X.

As illustrated in FIG. 3, the flute 7 may surround the body 3 on the outer periphery thereof in the first region 21, the fourth region 24, and the second region 22. In this case, on the leading end side of the body 3, a length of an area where the helix angle is relatively great becomes long. This provides a great force for carrying chips toward the rear end of the body 3, that is, pushing the chips upward, which improves chip discharge performance.

On the other hand, as illustrated in FIG. 5, the flute 7 may not surround the body 3 on the outer periphery thereof in the third region 23. In a case that the third region 23 is configured in this manner, the rigidity of the rear end side of the body 3 may be great, and the force for pushing the chips up may be less likely to be reduced excessively. As a result, both rigidity and chip discharge performance of the body 3 can be improved in a compatible manner.

As illustrated in the example illustrated in FIG. 3 and FIG. 4, the first groove 7 may include a first portion 22a located closer to the first region 21 and a second portion 22b that is next to the first portion 22a and located closer to the rear end in the second region 22. As illustrated in the example illustrated in FIG. 8 and FIG. 9, in a cross section orthogonal to the rotation axis X, the groove width W2 of the second portion 22b may be greater than a groove width W1 of the first portion 22a.

In a case that the second region 22 is configured as described above, the second portion 22b, which is relatively wide in the second region 22, may be located away from the fourth region 24. The fourth helix angle θ4 changes in the fourth region 24. As a result, in the fourth region 24, the outflow direction of the chips tends to be unstable. However, the width of the first portion 22a located on the leading end side of the second region 22 may be relatively narrow. This makes the outflow direction of the chips stable in the first portion 22a even in a case where the chips pass through the fourth region 24 in a state in which the outflow direction is unstable.

In addition, in a case that the second region 22 may include the second portion 22b having a relatively large width, friction between the chips and the flute 7 can be reduced, and chips, whose outflow direction is stable, can be discharged more smoothly. In particular, in a case that machining is performed by use of a coolant, the space between the chips and the inner wall of the flute 7 may be more likely to be large in the second portion 22b, which is relatively wide. This makes it possible to pass the coolant easily and discharge chips more easily.

In a case that the second region 22 includes the first portion 22a and the second portion 22b, the lengths of the first portion 22a and the second portion 22b in the direction along the rotation axis X may not be particularly limited to specific lengths. However, in a case that the length of the second portion 22b in the direction along the rotation axis X is greater than the length of the first portion 22a in the direction along the rotation axis X, the chips may be more easily discharged.

Figure 8:
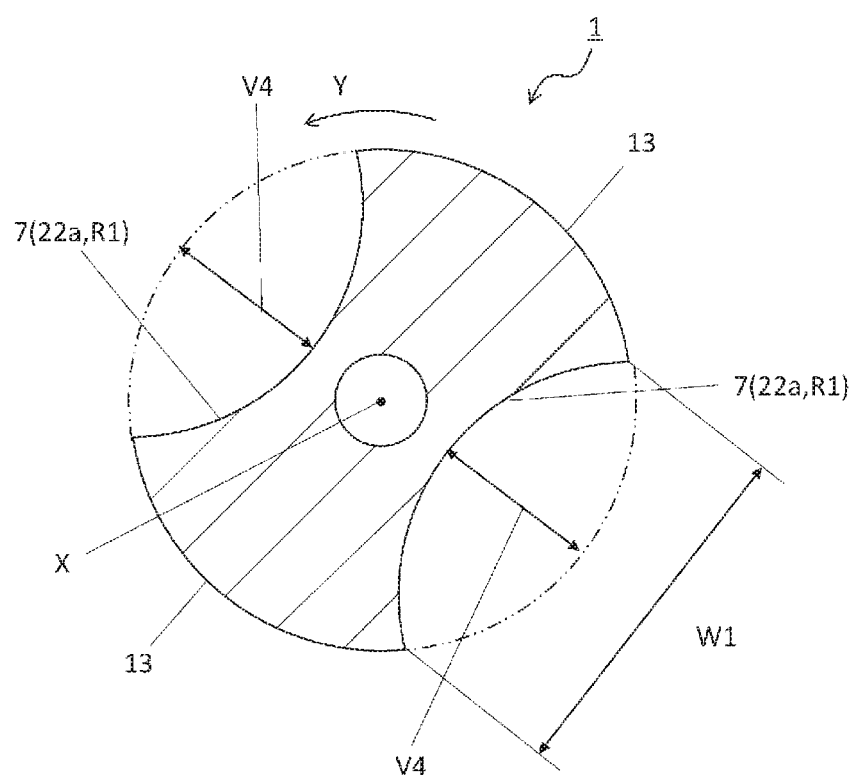
FIG. 8 is a cross-sectional view of the drill illustrated in FIG. 3 at D3.

Further, as illustrated in the cross-sectional view orthogonal to the rotation axis X of FIG. 8, the first portion 22a may include a single first concave curved line portion R1. In the case where the first portion 22a is configured as described above, the outflow direction of the chips extending in a spiral shape may be more easily stable. Also, as illustrated in the cross-sectional view orthogonal to the rotation axis X of FIG. 9, the second portion 22b may have a configuration in which two second concave curved line portions, namely, a second concave curved line portion R2A located frontward in the rotation direction of the rotation axis X and a second concave curved line portion R2B located rearward in the rotation direction of the rotation axis X, may be connected. In a case that the second portion 22b is configured as described above, the rigidity of the body 3 may be great, and the area configured to come in contact with the chips can be reduced. As a result, chips may be less likely to be clogged, which can exhibit high chip discharge performance even under condition for forming a hole with a great depth by machining.

In the case the second portion 22b has a shape in which the two second concave curved line portions (R2A, R2B) are connected as described above, the two second concave curved line portions (R2A, R2B) may form arcs having the same radius of curvature in a cross section orthogonal to the rotation axis X. According to such a configuration, chips may be less likely to be clogged, and the flow of chips can be made smoother. Also in manufacturing the drill 1, in the case that the two second concave curved line portions (R2A, R2B) form arcs having the same radius of curvature, the two second concave curved line portions (R2A, R2B) may be formed at the same processing conditions. Therefore, manufacturing of the drill 1 may be facilitated.

The same radius of curvature does not require that the radius of curvature is exactly the same. There may be some difference of approximately 5% in the radius of curvature between the two second concave portions (R2A, R2B).

Figure 9:
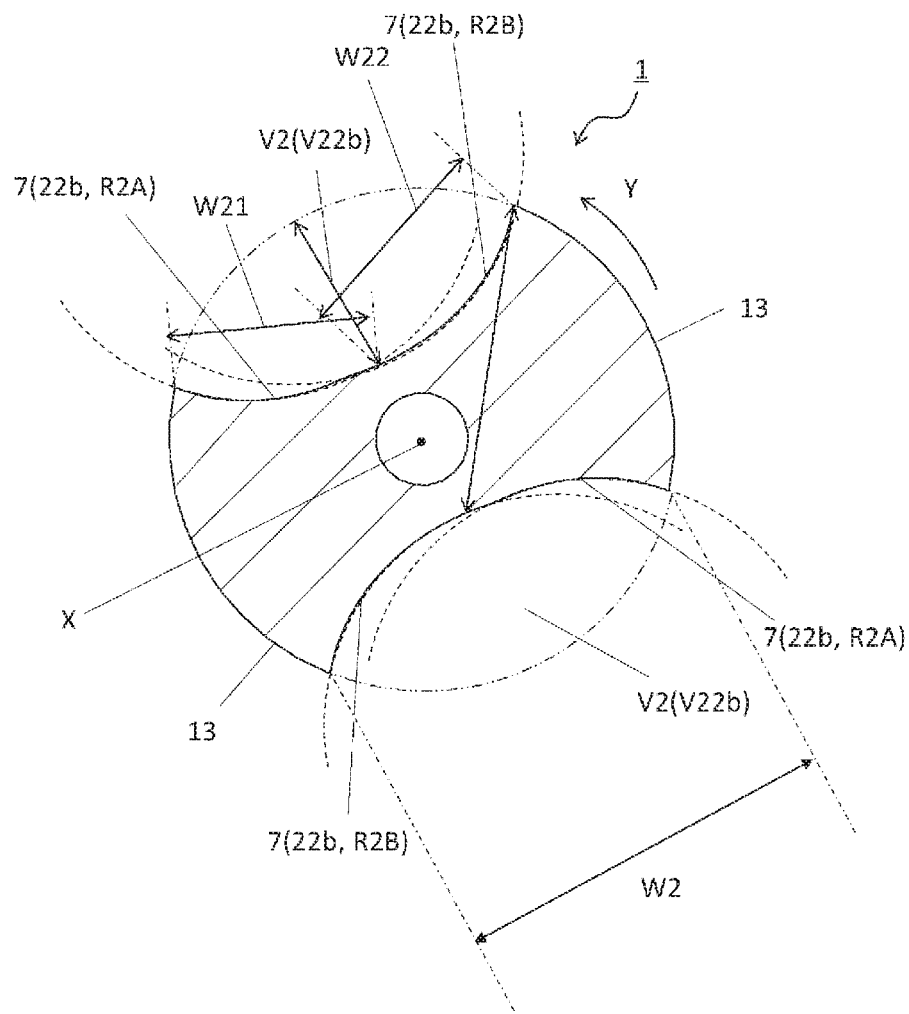
FIG. 9 is a cross-sectional view of the drill illustrated in FIG. 3 at D4.
Figure 10:
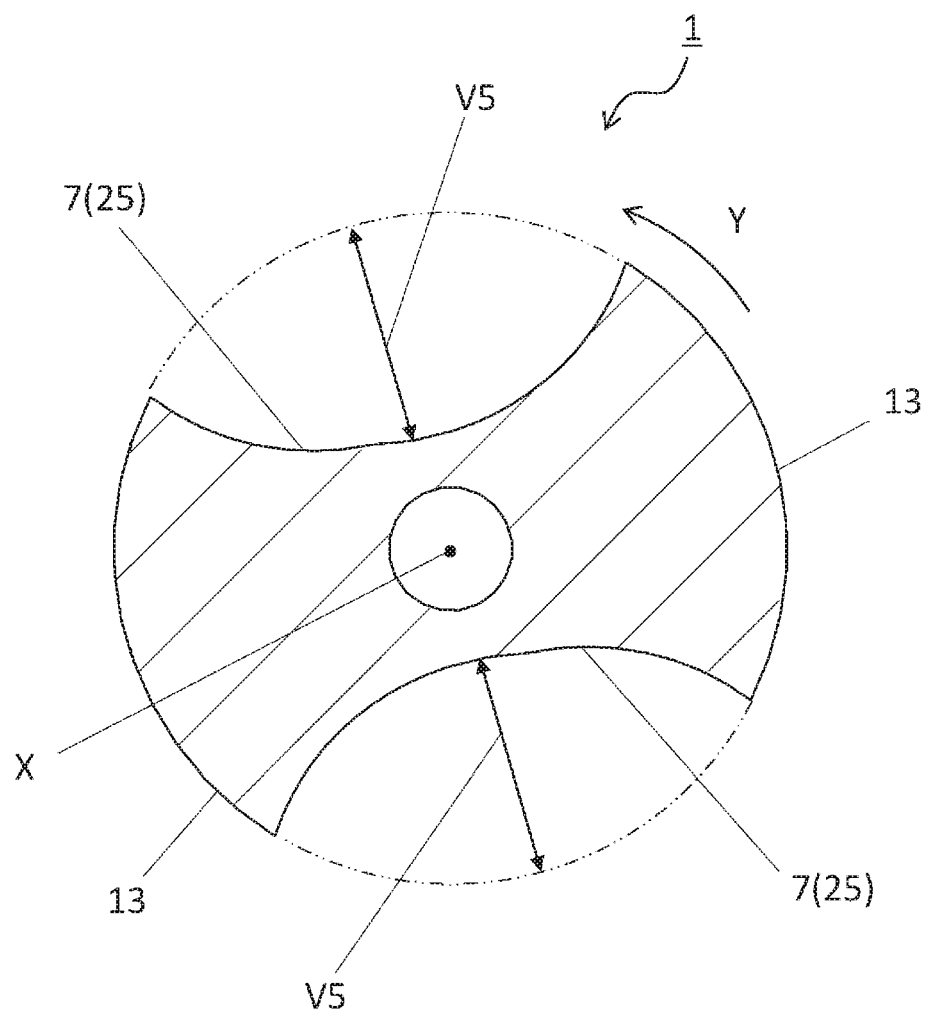
FIG. 10 is a cross-sectional view of the drill illustrated in FIG. 3 at D5.

As illustrated in an example illustrated in FIG. 9, a groove width W22 of the second concave curved line portion R2B may be greater than a groove width W21 of the second concave curved line portion R2A. If the chips pass through the second portion 22b, the chips may be easily positioned rearward in the rotation direction Y. In a case that the groove width W22 of the second concave curved line portion R2B located rearward in the rotation direction Y is relatively great, chips easily pass through the second portion 22b.

The region of the flute 7 located closer to the rear end than the second region 22 may have two concave curved line portions in a cross section orthogonal to the rotation axis X, such as the second portion 22b. That is, the second portion 22b, the fifth region 25, and the third region 23 of the flute 7 may have two concave curved line portions in a cross section orthogonal to the rotation axis X. According to the example illustrated in FIG. 12, in the flute 7, the region including the two concave curved line portions may have a length L6. In this case, the effect of improving chip discharge performance while securing the rigidity of the body 3 is enhanced.

Figure 11:
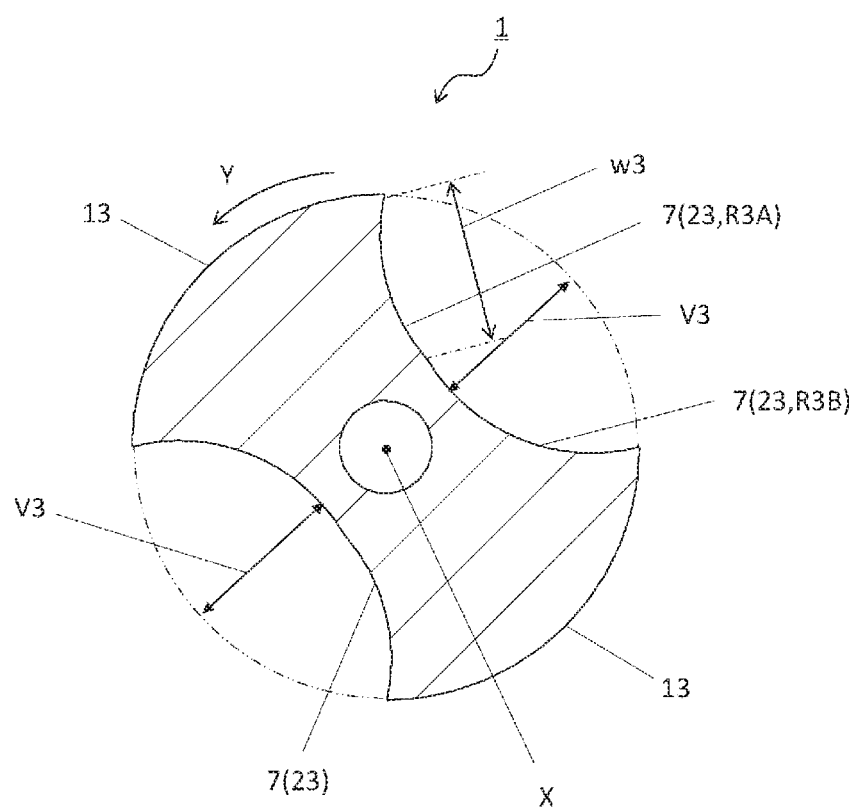
FIG. 11 is a cross-sectional view of the drill illustrated in FIG. 3 at D6.

Here, the two concave curved line portions in the third region 23 may be referred to as a third concave curved line portion R3A and a third concave curved line portion R3B. In an example illustrated in FIG. 11, the third region 23 may include a third concave curved line portion R3A, and a third concave curved line portion R3B located rearward in the rotation direction Y of the rotation axis X than the third concave curved line portion R3A.

As illustrated in the example illustrated in FIG. 3, a groove width W3 of the third concave curved surface portion R3A may decrease toward the rear end. In the case that the third region 23 has the configuration described above, the groove width W3 of the third region 23 can be gradually decreased while ensuring the space in the third concave curved surface portion R3B in which the chips flow. As a result, the rigidity of the portion toward the rear end of the flute 7 can be improved while exhibiting high chip discharge performance. At this time, the groove width of the third concave curved surface portion R3B may be constant even toward the rear end.

Also, as examples illustrated in FIG. 6 to FIG. 11, the maximum value of the groove depths V1 to V5 in each of the first regions 21, the second regions 22, the third region 23, the fourth region 24, and the fifth region 25 may be the same. In this case, there may be a small variation in the groove depth in each region of the first region 21 to the fifth region 25. As a result, the rigidity of the body 3 may be great.

Here, "the maximum value of the groove depth V in each region is the same" does not mean that each of the regions has exactly the same maximum value of the groove depth, but may have variations of approximately 5% in the maximum value of the groove depth V.

The depths V1 to V5 of the first region 21 to fifth region 25 may be constant from the leading end side to the rear end side. Here, the constant depth V of each region does not mean that the depth is strictly constant from the leading end side to the rear end side, and the depth V of each region may vary by approximately 5%.

The depth V of the flute 7 may be set to, for example, approximately from 10 to 40% with respect to the outer diameter of the cutting portion 11. The depth V of the flute 7 refers to a value obtained by subtracting a distance between a bottom of the flute 7 and the rotation axis X from a radius of the body 3 in the cross section orthogonal to the rotation axis X as illustrated in FIG. 6 to FIG. 11. The bottom means a portion closest to the rotation axis X of the flute 7.

That is, a web thickness indicated by a diameter of an inscribed circle in the cross section orthogonal to the rotation axis X at the body 3 may be set to from 20 to 80%, for example, with respect to the outer diameter of the cutting portion 11. Specifically, for example, in a case where the outer diameter D of the cutting portion 11 may be 20 mm, the depth V of the flute 7 can be set to approximately from 2 to 8 mm.

The groove depth V1 in the first region 21 may be reduced on the leading end side of the body 3. That is, the groove depth V1 of the first region 21 may increase from the leading end side toward the rear end side. In this case, in the first region 21, chips generated by the cutting edge 5 can be curled on the leading end side where the groove depth is relatively shallow such that the diameter of the curls is small, and then the chips can be discharged through the inside of the flute 7 more smoothly toward the rear end of the body 3.

Furthermore, as illustrated in the example illustrated in FIG. 6 to FIG. 11, in a cross section orthogonal to the rotation axis X, the first region 21, the second region 22, the third region 23, the fourth region 24, and the fifth region 25 may each include a concave curved line portion. In this case, chips curl along the inner wall of the flute 7, and the chips tend to curve, which can further improve chip discharge performance.

Method for Manufacturing Machined Product

Figure 13:
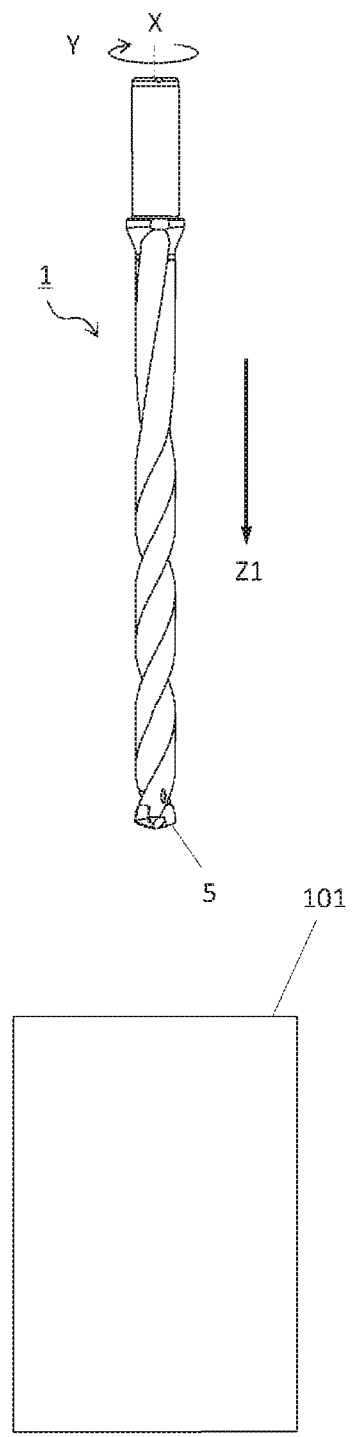
FIG. 13 is a view illustrating a step of a method for manufacturing a machined product according to an example of a non-limiting embodiment.
Figure 14:
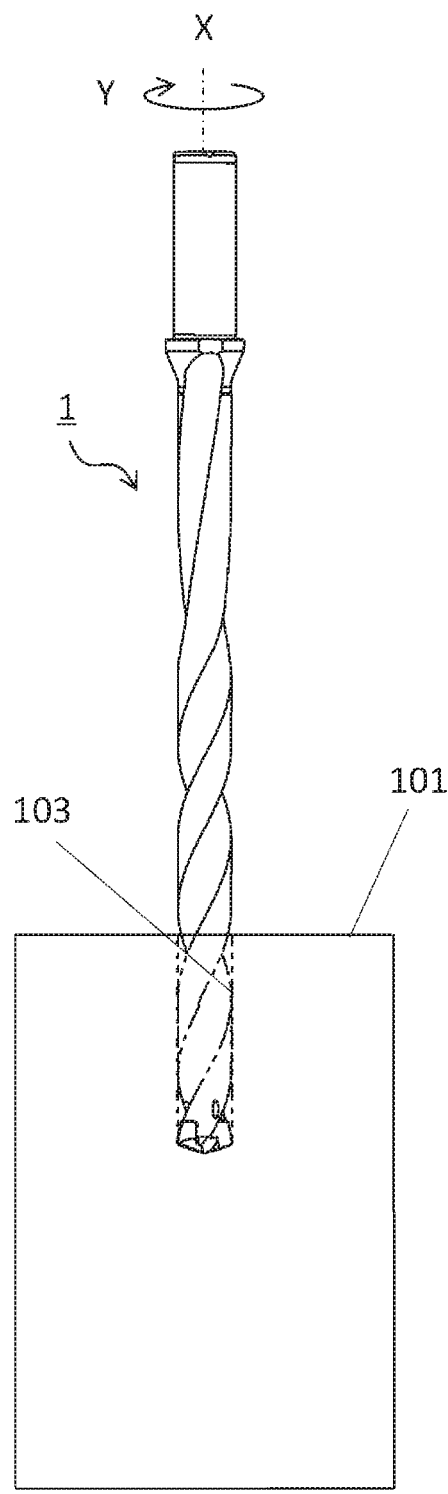
FIG. 14 is a view illustrating a step of a method for manufacturing a machined product according to an example of a non-limiting embodiment.
Figure 15:
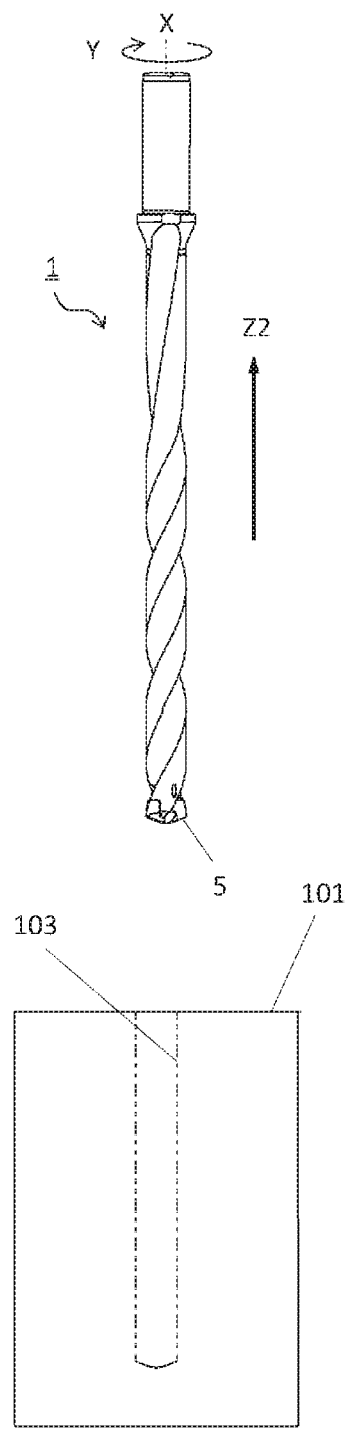
FIG. 15 is a view illustrating a step of a method for manufacturing a machined product according to an example of a non-limiting embodiment.

Next, a method for manufacturing a machined product according to a non-limiting embodiment will be described in detail using the drill 1 described above as an example. Below, a description will be given with reference to FIG. 13 to FIG. 15. In FIG. 13 to FIG. 15, a machine tool for gripping a shank may be omitted.

The method for manufacturing a machined product of an example illustrated in FIG. 13 to FIG. 15 may include the following steps (1) to (4).

(1) A step of arranging the drill 1 above a prepared workpiece 101 (refer to FIG. 13).

(2) A step of rotating the drill 1 in a direction of the arrow Y around the rotation axis X and bringing the drill 1 toward the workpiece 101 in a direction Z1 (refer to FIG. 13).

(3) A step of bringing the drill 1 closer to the workpiece 101 and causing the drill 1 that is rotating to come into contact with a desire position on a surface of the workpiece 101 to form a machined hole 103 (through-hole) in the workpiece 101 (refer to FIG. 14).

(4) A step of separating the drill 1 from the workpiece 101 in a Z2 direction (refer to FIG. 15).

The step (2), for example, may be performed by fixing the workpiece 101 on a table of the machine tool having the drill 1 installed thereto and bringing the drill 1 close to the workpiece 101 while rotating the drill 1. In the step (1), the workpiece 101 and the drill 1 may be brought relatively close to each other, or the workpiece 101 may be brought close to the drill 1.

In the step (3), the entire cutting portion of the drill 1 may be inserted into the workpiece 101, or a portion of the cutting portion of the drill 1 on the rear end side does not need to be inserted into the machined hole 103. In a case where a portion of the cutting portion of the drill 1 on the rear end side is not inserted into the machined hole 103, a part of region of the cutting portion on the rear end side can function as a region for discharging chips. This makes it possible to provide excellent chip discharge performance with the part of region.

In the step (4) as well, similar to the step (2) above, the workpiece 101 and the drill 1 may be relatively separated from each other, or the workpiece 101 may be separated from the drill 1, for example.

Through such steps (1) to (4) as described above, the machined product including the machined hole 103 can be obtained.

Here, when machining the workpiece 101 as described above may be carried out a plurality of times, and, for example, a plurality of machined holes 103 are formed in one workpiece 101, the bringing the cutting edge of the drill 1 into contact with a different location of the workpiece 101 may be repeated with the drill 1 being rotated.

Various aspects of the drill 1 may be described above. However, the drill according to the present non-limiting embodiments is not limited thereto, and, needless to say, the drill may have any configuration without departing from the spirit of the present invention.

For example, the drill 1 is described as the cutting tool according to an example of a non-limiting embodiment, but it is possible to use an end mill or reamer to which the gist of the present invention may have been applied. Furthermore, the cutting portion 11 may have a configuration in which the portion including the leading end is detachable with respect to the portion on the rear end side, or the cutting portion 11 may be constituted only by one member.

REFERENCE SIGNS LIST

1 Rotary tool (drill)
3 Body
5 Cutting edge
5*a* Main cutting edge
5*b* Sub cutting edge
7 First groove (flute)
9 Shank
11 Cutting portion
13 Land 21 First region
22 Second region
22a First portion
22b Second portion
23 Third region
24 Fourth region
25 Fifth region
101 Workpiece
103 Machined hole
θ1, θ2, θ3, θ4, θ5 First helix angle to fifth helix angle
V1, V2, V3, V4, V5 Groove depth in first region to groove depth in fifth region

The invention claimed is:

1. A rotary tool comprising:
a body having a rod-like shape and extending along a rotation axis from a first end toward a second end, wherein
the body comprises:
a cutting edge located at the first end; and
a first groove extending in a spiral manner from the cutting edge toward the second end,
the first groove comprises:
a first region having a first helix angle;
a second region located closer to the second end than the first region and having a second helix angle;
a third region located closer to the second end than the second region and having a third helix angle;
a fourth region located between the first region and the second region and having a fourth helix angle; and
a fifth region located between the second region and the third region and having a fifth helix angle,
the second helix angle is less than the first helix angle and greater than the third helix angle,
the fourth helix angle and the fifth helix angle each decrease from a side of the first end toward the second end,
a decreasing range of a value of the fourth helix angle is less than a decreasing range of a value of the fifth helix angle, and
a length of the fourth region in a first direction along the rotation axis is greater than a length of the fifth region in the first direction.

2. The rotary tool according to claim 1, wherein the first groove surrounds the body on an outer periphery of the body in the first region, the fourth region, and the second region.

3. The rotary tool according to claim 1, wherein the first groove does not surround the body on an outer periphery of the body in the third region.

4. The rotary tool according to claim 1, wherein the second region comprises a first portion and a second portion located closer to the second end than the first portion, and
in a cross section orthogonal to the rotation axis, a groove width of the second portion is greater than a groove width of the first portion.

5. The rotary tool according to claim 4, wherein a length of the second portion in the first direction is greater than a length of the first portion in the first direction.

6. The rotary tool according to claim 4, wherein in each cross section orthogonal to the rotation axis,
the first portion comprises a first concave portion having a curved line shape, and
the second portion comprises:
a second front concave portion having a curved line shape; and
a second rear concave portion having a curved line shape, located rearward of the second front concave portion in a rotational direction of the rotation axis and connected to the second front concave portion.

7. The rotary tool according to claim 6, wherein in a cross section orthogonal to the rotation axis,
a groove width of the second rear concave portion is greater than a groove width of the second front concave portion.

8. The rotary tool according to claim 4, wherein the first portion is in contact with the second portion.

9. The rotary tool according to claim 1, wherein in a cross section orthogonal to the rotation axis,
the third region comprises:
a third front concave portion having a curved line shape; and
a third rear concave portion having a curved line shape and located rearward of the third front concave portion in the rotational direction; and
a groove width of the third front concave portion gradually decreases toward the second end.

10. The rotary tool according to claim 1, wherein a maximum depth of the first groove in the first region, the second region, the third region, the fourth region, and the fifth region are the same.

11. The rotary tool according to claim 1, wherein in each cross section orthogonal to the rotation axis,
the first region, the second region, the third region, the fourth region,
and the fifth region comprise concave curved line portions.

12. A method for manufacturing a machined product, comprising:
rotating the rotary tool according to claim 1;
bringing the rotary tool that is rotating into contact with a workpiece; and
separating the rotary tool from the workpiece.

13. The rotary tool according to claim 1, wherein the first region is in contact with the cutting edge.

* * * * *